US012801533B2

(12) United States Patent
Becker et al.

(10) Patent No.: US 12,801,533 B2
(45) Date of Patent: Nov. 17, 2026

(54) MULTIPLE ADDRESS BOUNDARY CHECKING

(71) Applicant: Arm Limited, Cambridge (GB)

(72) Inventors: Alan Jeremy Becker, Cambridge (GB); Richard F. Bryant, Chandler, AZ (US); Paul Gilkerson, Cherry Hinton (GB); David Madsen, Chandler, AZ (US); François Christopher Jacques Botman, Cherry Hinton (GB); Thomas Christopher Grocutt, Cherry Hinton (GB); Brendan Thomas Ruiz, Chandler, AZ (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 19/054,206

(22) Filed: Feb. 14, 2025

(65) Prior Publication Data

US 2026/0244574 A1 Aug. 20, 2026

(51) Int. Cl.
*G06F 12/10* (2016.01)

(52) U.S. Cl.
CPC .................................... *G06F 12/10* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048;

(Continued)

(56) References Cited

U.S. PATENT DOCUMENTS

| | | | | |
|---|---|---|---|---|
| 6,047,364 | A * | 4/2000 | Kolagotla | G06F 5/10 711/219 |
| 6,233,667 | B1 * | 5/2001 | Shaylor | G06F 12/0223 711/202 |
| 11,720,356 | B2 * | 8/2023 | Grocutt | G06F 9/30021 712/208 |

OTHER PUBLICATIONS

How to check if a pointer is in a range of memory; Raymond Chen; Sep. 27, 2017; retrieved from https://devblogs.microsoft.com/oldnewthing/20170927-00/?p=97095#:~:text=Raymond%20Chen,cases,%20the%20behavior%20is%20undefined. (Year: 2017).*

(Continued)

*Primary Examiner* — Daniel C. Chappell
(74) *Attorney, Agent, or Firm* — NIXON & VANDERHYE P.C.

(57) ABSTRACT

An apparatus is provided in which upper comparison circuitry compares an address to an end of a region to produce a first intermediate result and lower comparison circuitry compares an adjacent address to the address to a start of the region to produce a second intermediate result. Output circuitry uses the first intermediate result and the second intermediate result to output an extent to which the address and the adjacent address are covered by the region without the lower comparison circuitry comparing the address or without the upper comparison circuitry comparing the adjacent address.

18 Claims, 8 Drawing Sheets

(58) Field of Classification Search
CPC ............... G06N 7/00-08; G06N 10/00; G06N 20/00-20; G06N 99/00-007; G06T 1/00-60; G06V 30/00-43; G11B 20/00-24; G11B 33/00-1493; G11C 11/00-5692; G11C 13/00-06; G11C 14/00-009; G11C 15/00-06; G11C 16/00-3495; G11C 17/00-18; G11C 2207/00-229; G11C 2216/00-30; H03M 7/00-707; H03M 13/00-6597; H03M 99/00; H04L 9/00-38; H04L 12/00-66; H04L 41/00-5096; H04L 49/00-9094; H04L 61/00-59; H04L 67/00-75; H10W 90/00-811; H10W 95/00; H10W 99/00
See application file for complete search history.

(56) References Cited

OTHER PUBLICATIONS

Definition of "immediately"; Mar. 28, 2023; Merriam Webster Online Dictionary; retrieved from https://web.archive.org/web/20230328200435/https://www.merriam-webster.com/dictionary/immediately (Year: 2023).*

* cited by examiner 102 104 106

| Base | Limit | Attributes |
|---|---|---|
| 00000000 | 00001000 | 0xFF4 |
| 00001000 | 00002000 | 0x19D |
| 00001000 | 00003000 | 0x744 |
| 00000000 | 00000fe0 | 0x5D1 |

100

FIG. 2

```
func compare_base(A, B)
diff[32:5] = A[31:5]-B[31:5]
// Return equals if to the same 32 byte block and the lookup address is the bottom of the block
if (diff[32:5] == 28'd0) && (A[4:2] == 3'b000)
return "equals"
else if diff[32]
return "less-than"
else
return "greater-than"
```

FIG. 4A

```
func compare_limit(A, B)
diff[32:5] = A[31:5]-B[31:5]
// Return equals if to the same 32 byte block and the lookup address is the top of the block
if (diff[32:5] == 28'd0) && (A[4:2] == 3'b111)
return "equals"
else if (diff[32:5] == 28'd0) || diff[32]
return "less-than"
else
return "greater-than"
```

FIG. 4B

| Example | addr | addr+4 | region base(s) | region limit(s) | comp_base | comp_limit | Conclusion |
|---|---|---|---|---|---|---|---|
| 1 | 00000000 | 00000004 | 00000000 | 00001000 | gt | lt | Both words in region |
| 2 | 00000ff8 | 00000ffc | 00001000 | 00002000 | lt | lt | Neither word in region |
| 3 | 00000ffc | 00001000 | 00001000 | 00002000 | eq | lt | Result is partial so LSU will replay and serialize |
| 4 | 00000ffc | 00001000 | 00000000 | 00002000 | gt | lt | Overlapping region case: |
| | | | 00001000 | 00003000 | eq | lt | One word in region but the other is partial so LSU will replay and serialise |
| 5 | 0000101c | 00001020 | 00000000 | 00001000 | lt | gt | Result is partial so LSU will replay and serialise |
| 6 | | | 00000000 | 00001000 | gt | gt | Neither word in region |
| 7 | 00000ffc | 00001000 | 00000000 | 00000fe0 | gt | eq | Region crossing case: |
| | | | 00001000 | 00002000 | eq | lt | Two partial results so LSU will replay and serialise |
| 8 | 00002000 | 00002004 | 00001000 | 00002000 | gt | eq | Both words in region |

FIG. 6

MULTIPLE ADDRESS BOUNDARY CHECKING

TECHNICAL FIELD

The present disclosure relates to data processing.

DESCRIPTION

In a number of situations, it may be desirable to compare multiple adjacent addresses to the boundaries of a region to determine whether the addresses are covered by the region, not covered by the region, or cross the region boundaries. When doing this for a number of addresses, it may be tempting to simply increase the number of comparison circuits, but doing so increases circuit size and power consumption. It would therefore be desirable to allow such boundary checking for multiple addresses while limiting any additional circuitry that is required.

SUMMARY

Viewed from a first example configuration, there is provided an apparatus comprising: upper comparison circuitry configured to compare an address to an end of a region to produce a first intermediate result; lower comparison circuitry configured to compare an adjacent address to the address to a start of the region to produce a second intermediate result; and output circuitry configured to use the first intermediate result and the second intermediate result to output an extent to which the address and the adjacent address are covered by the region without the lower comparison circuitry comparing the address or without the upper comparison circuitry comparing the adjacent address.

Viewed from a second example configuration, there is provided a method comprising: comparing an address to an end of a region to produce a first intermediate result; comparing an adjacent address to the address to a start of the region to produce a second intermediate result; and using the first intermediate result and the second intermediate result to output an extent to which the address and the adjacent address are covered by the region without comparing the address to the start of the region or without comparing the adjacent address to the end of the region.

Viewed from a third example configuration, there is provided a non-transitory computer-readable medium to storing computer-readable code for fabrication of an apparatus comprising: upper comparison circuitry configured to compare an address to an end of a region to produce a first intermediate result; lower comparison circuitry configured to compare an adjacent address to the address to a start of the region to produce a second intermediate result; and output circuitry configured to use the first intermediate result and the second intermediate result to output an extent to which the address and the adjacent address are covered by the region without the lower comparison circuitry comparing the address or without the upper comparison circuitry comparing the adjacent address.

Viewed from a fourth example configuration, there is provided a system comprising: the apparatus, implemented in at least one packaged chip; at least one system component; and a board, wherein the at least one packaged chip and the at least one system component are assembled on the board.

Viewed from a fifth example configuration, there is provided a chip-containing product comprising the system, wherein the system is assembled on a further board with at least one other product component.

BRIEF DESCRIPTION OF THE DRAWINGS

The present invention will be described further, by way of example only, with reference to embodiments thereof as illustrated in the accompanying drawings, in which:

FIG. 2 shows an example of memory regions being defined, together with a set of attributes that are applicable to each region;

FIGS. 4A and 4B show examples of the behaviour of the lower comparison circuitry and upper comparison circuitry in accordance with some examples;

FIG. 6 shows an example of how the outputs from comparators that compare an address to a boundary of a region can be translated into an indication of the extent to which a pair of addresses fall within the boundary of a region;

DESCRIPTION OF EXAMPLE EMBODIMENTS

Figure 1:
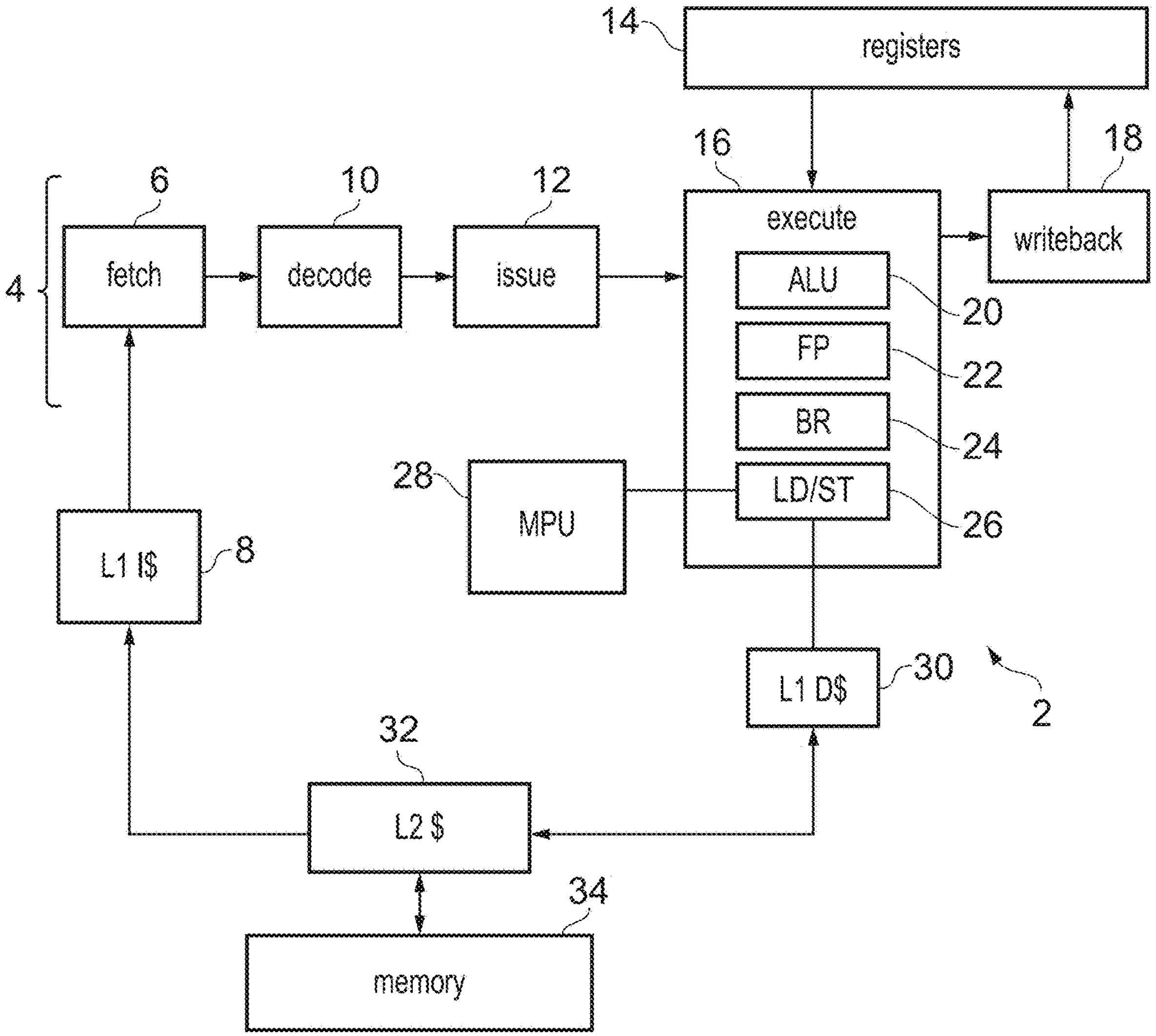
FIG. 1 illustrates a processing system.

Before discussing the embodiments with reference to the accompanying figures, the following description of embodiments is provided.

In some examples, an apparatus is provided that comprises: upper comparison circuitry configured to compare an address to an end of a region to produce a first intermediate result; lower comparison circuitry configured to compare an adjacent address to the address to a start of the region to produce a second intermediate result; and output circuitry configured to use the first intermediate result and the second intermediate result to output an extent to which the address and the adjacent address are covered by the region without the lower comparison circuitry comparing the address or without the upper comparison circuitry comparing the adjacent address.

The address and the adjacent address collectively form an upper address and a lower address. Such a situation may arise where a wide data type is being accessed for instance where the processor has a number of bits and an item of data, which is bigger than that, is accessed. For instance, the processor may be a 32-bit processor with a 64-bit data item being accessed. In this situation, the data item may be represented by accesses to two separate 32-bit 'words'. Consequently, such data item could theoretically span two different regions—the first 32-bits in one region and the second 32-bits in the second region. It is desirable to be able to determine this situation quickly without performing a large number of comparisons. The present technique solves this by providing two specific comparisons—the address (the lower word) is compared to the limit of the region and the adjacent address (the upper word) is compared to the base of the region. It is therefore possible to determine, in many cases, the extent to which each word is covered by the regions without further comparisons being performed.

In some examples, the extent to which the address and the adjacent address are covered by the region comprises any one of: both the address and the adjacent address are covered by the region, neither the address nor the adjacent address are covered by the region, and a strict subset of the address and the adjacent address are covered by the region. There are a number of ways of representing the extent to which the address and adjacent address are covered by the region, but in these examples there are three possible outcomes. In a first outcome, both the address and the adjacent address are said to be covered by the region (e.g. within the region). In a second outcome, neither the address nor the adjacent address are said to be covered by the region (e.g. they both fall outside the region). Finally, in the third outcome, some of the addresses (e.g. one of the address and the adjacent address) is covered by the region and the other of the addresses is not covered by the region. Note that in the third instance, it may not immediately be known which of the address and the adjacent address is within the region and which is outside it.

In some examples, in response to the output circuitry outputting that the strict subset of the address and the adjacent address are covered by the region, the address and the adjacent address are sent to each of the lower comparison circuitry and the upper comparison circuitry, and the lower comparison circuitry compares both the address and the adjacent address, and the upper comparison circuitry compares both the address and the adjacent address. Where a partial result occurs, this indicates that one of the addresses (e.g. half of a data value), with the other address potentially being covered by another region. When this occurs, the addresses can be (re)provided so that both of the addresses can be compared to both of the boundaries of the regions.

In some examples, the lower comparison circuitry is configured, in response to the output circuitry outputting that the strict subset of the address and the adjacent address are covered by the region, to serially compare the address and the adjacent address to the start of the region; and the upper comparison circuitry is configured, in response to the output circuitry outputting that the strict subset of the address and the adjacent address are covered by the region, to serially compare the address and the adjacent address to the end of the region. As a consequence, each address can be compared against the base and limit of each region thereby providing an accurate indication of which region applies to which word (if any).

In some examples, the adjacent address immediately follows the address. If addresses are intended to refer to N-bit sections of memory then such addresses comprise N/8 bits (there being eight bits in a byte). Consequently, two adjacent memory addresses are addresses that differ by four bytes. Thus, addresses 1000 and 1004 are adjacent, and addresses 994 and 990 are adjacent. In these examples, however, the address is considered to be the lower address and the adjacent address is not merely adjacent but immediately follows the address and is therefore the upper address.

In some examples, the upper comparison circuitry is configured to produce the first intermediate result as the address being greater than the end of the region, or as the address being less than or equal to the end of the region.

In some examples, the upper comparison circuitry is configured to produce the first intermediate result as any one of: the address being greater than the end of the region, the address being less than the end of the region, and the address being equal to the end of the region. The upper comparison circuitry can thus return any one of these results for a given comparison.

In some examples, the lower comparison circuitry is configured to produce the second intermediate result as any one of: the adjacent address being greater than the start of the region, or as the address being less than the start of the region, and the address being or equal to the start of the region. The lower comparison circuitry can thus return any one of these results for a given comparison.

In some examples, the upper comparison circuitry is configured to produce the first intermediate result as the address being greater than the end of the region, less than the end of the region, or equal to the end of the region; the lower comparison circuitry is configured to produce the second intermediate result as the adjacent address being greater than the start of the region, less than the start of the region, or equal to the start of the region; and the output circuitry is configured to output the result as the address and the adjacent address being covered by the region in response to both the first intermediate result being that the address is less than the end of the region and the second intermediate result being that the adjacent address is greater than the start of the region. In these examples each of the comparison circuitries is able to produce a 'greater than', 'less than', or 'equal to' result for the comparison between one part of the region and a given address. The output circuitry therefore receives two comparison results (a first intermediate result and a second intermediate result). When the first intermediate result is that the address (e.g. the upper address) is less than the end of the region, the lower address will also be less than the end of the region. The end of the portion of memory referred to by the upper address will also be within the region. Meanwhile, since the upper address is greater than the base address, this means that the lower address will be greater than or equal to the base address. Consequently, both addresses are covered by the region.

In some examples, the output circuitry is configured to output the result as the address and the adjacent address not being covered by the region in response to the first intermediate result and the second intermediate result being the same. Where the first intermediate result and the second intermediate result are both the same (e.g. both 'greater than' the address they were compared to or both 'less than' the address that they were compared to) then neither of the addresses are within the region. Either both addresses are before the start of the region or both address are after the end of the region. In a situation where both results are the same and equal (e.g. both are 'equal' to the compared boundary) then this would mean that the base address and the limit address are the same and so by definition, all addresses would fall outside the region (which is of zero length).

In some examples, the output circuitry is configured to output the result as a strict subset of the address and the adjacent address being covered by the region in response to either the first intermediate result indicating that the address is equal to the end of the region, or the second intermediate result indicating that the adjacent address is equal to the start of the region. Where one of the results indicates equality (either the lower address is equal to the region limit, or the upper address is equal to the region base) then the other address will fall outside the region and thus there is a 'partial' coverage or overlap.

In some examples, the apparatus comprises: region storage circuitry configured to store region boundaries for a plurality of regions including the region; and region identification circuitry configured to perform a determination of which of the regions the address and adjacent address are covered by, using the first intermediate result and the second intermediate result calculated for the start address and the end address of each of the region boundaries. The region storage is used to define one or more regions—each with a start and end. This could be achieved by storing a start address and end address or providing a start address and a region size (the end address can then be calculated for use with the upper comparison circuitry). Also associated with each region definition is a set of attributes that indicate how the region can be used (e.g. security settings and/or permissions). When a particular region 'hits' (e.g. when the supplied address(es) are indicated as being covered by a region), the attributes associated with that region are returned.

In some examples, the upper comparison circuitry comprises no more than one comparator for each of the regions; and the lower comparison circuitry comprises no more than one comparator for each of the regions. In these examples, two comparators are provided for each region that can be simultaneously stored in the region storage circuitry—one for each region's start address to be compared and one for each region's end address to be compared. The number of comparisons that is performed for the first intermediate result and second intermediate result to be produced is therefore two multiplied by the number of regions that are simultaneously stored in the region storage circuitry. In some examples, the one of the attribute sets that covers the address and the adjacent address are returned within a single processor cycle.

In some examples, the apparatus comprises: error detection circuitry configured to respond to the address being covered by a plurality of the regions by generating an error event. In many architectures, a single address being covered by multiple regions is considered to be an error since this can lead to ambiguity regarding what permissions or attributes apply. How this is dealt with will differ between architectures. In some cases, the first region that matches will apply. In other cases, the second region that matches will apply. In other cases, the result will be nondeterministic and may simply be the first or second region to be matched. In some cases, no result may be returned as a consequence of the situation being ambiguous. Other architectures may be able to resolve this non-ambiguously by merging permissions or attributes. For instance, the strictest (or weakest) permissions/attributes might apply. Regardless of how the potential ambiguity is resolved, an error may or may not be raised. The error allows for a user or for software to be aware of the situation and respond accordingly. This can be achieved, for instance, by raising an exception or interrupt.

Particular embodiments will now be described with reference to the figures.

FIG. 1 schematically illustrates an example of a data processing apparatus 2. The data processing apparatus has a processing pipeline 4 (an example of processing circuitry, which could for example form part of a CPU (Central Processing Unit)). The processing circuitry 4 is for executing instructions defined in an instruction set architecture (ISA) to carry out data processing operations represented by the instructions. The processing pipeline 4 includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions defined in the ISA that are decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34.

A memory protection unit (MPU) 28 is provided for controlling memory access permission checks based on data access instructions. One or more tables within the MPU may specify access permissions or other attributes that apply to the address given in a particular data access instruction, which govern whether a given process executing on the pipeline is allowed to read, write or execute instructions from a given memory region. While the MPU 28 is shown as associated with the load/store unit 26, the MPU 28 may also be looked up on instruction fetches triggered by the fetch stage 6 (or a separate instruction-side MPU may be implemented to handle instruction fetches, separate from the data-side MPU used by the load/store unit 26 for data accesses.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness.

It will appreciated that although the above description makes reference to an MPU, the same techniques described herein can be applied to a memory management unit (MMU)

as well. Typically a memory management unit (MMU) can be thought of as a more feature-capable MPU that may also provide address translation capabilities, for instance.

Some architectures use a plurality of memory locations to represent larger data values. For instance, in a processor system that makes use of a 32-bit processor, an instruction may be provided that accesses a 64-bit value. In practice, this 64-bit value is stored in memory as two separate, adjacent 32-bit 'words' consisting of an upper word and a lower word. Similarly, an instruction that accesses a 128-bit value may be made up of four adjacent words (each of 32-bits). As a result of this, a single data value might cross into multiple regions defined by the MPU 28 and since attributes are defined on a per-region basis, this may lead to a complicated situation in which different attributes apply to different parts of a single data value.

FIG. 2 illustrates an example of a regions table 100 as may be used in an MPU 28 or MMU. The table defines a number of memory regions, each defined by a start address 102 and an end address 104—other representations are also possible. Each region also has a number of attributes associated. The precise meaning of the attributes here are irrelevant, but may relate to matters of permissions and security and so on. The base address and the limit address are aligned to the bit size of the processor. That is, for an N-bit system, the base address and limit address are both multiples of N. Consequently a regular N-bit value will exactly fit within one of the regions whereas an MN-bit data value (made up of M N-bit values) may cross the region boundaries. It is important to be able to detect this situation.

Note also here that in this example, the regions are not exclusive. That is, certain addresses may fall into multiple regions. This may or may not be allowed by the underlying architecture and where it is allowed, the manner in which this is interpreted can vary. In some situations, the attributes of the first region to match the address are used. In others, the attributes of the last region to match the address are used. In others, the behaviour is undefined and in any of these situations, an exception or interrupt (or other error action) may be performed. Although such situations are often undesirable, it has little bearing on the present technique, which may or may not detect this situation and respond to it accordingly.

Figure 3:
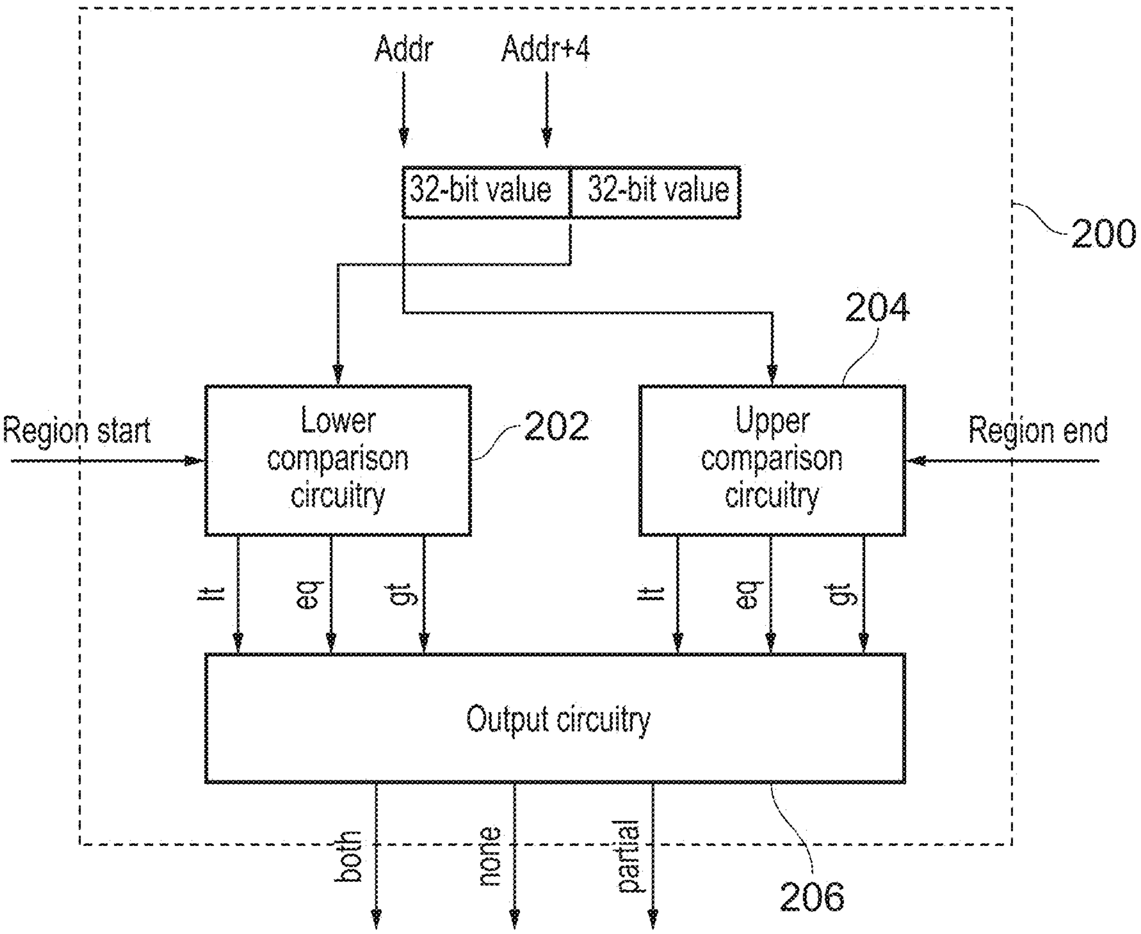
FIG. 3 shows an example of a bounds checking circuitry in accordance with some examples.

FIG. 3 illustrates an example of an apparatus 200 in accordance with some examples. Here, a pair of memory addresses (addr and addr+4), which are adjacent to one another, are provided. The underlying architecture is expected to be 32-bit and therefore each memory address points to a 32-bit value. 32-bits equate to four bytes (of eight bits). Consequently, in this example, the two addresses (which are separated by four) are considered to be adjacent. For a 64-bit system, the addresses would be adjacent if they were eight bytes apart. In general, for an N-bit system, two addresses are adjacent if one of the addresses points to byte M and the second address points to byte M+(N/4)—assuming bytes are aligned starting at zero.

Here, lower comparison circuitry 202 and upper comparison circuitry 204 are provided. The lower comparison circuitry 202 performs a comparison with the start address of the region and the upper comparison circuitry 204 provides a comparison with the end address of a region. For instance, taking examples from FIG. 2, the lower comparison circuitry 202 may perform a comparison on the address '00000000' and the upper comparison circuitry 204 may perform a comparison on the address '00001000' to see if a given address lies between these values (i.e. greater than or equal to the start address and less than the end address.

In this technique only two comparisons are needed in order to determine whether both the smaller address (addr) and the bigger address (addr+4) are within the boundaries. This is achieved by providing the bigger address (addr+4) to the lower comparison circuitry 202 and the smaller address (addr) to the upper comparison circuitry 204. Each of the comparison circuitries 202, 204 outputs either 'less than', 'equals', or 'greater then' as intermediate results depending on whether the supplied address is less than, equal to, or greater than the given boundary. The intermediate results are provided to output circuitry 206, which interprets them, in order to provide an indication of whether both addresses are covered by the boundary, whether neither address is covered by the boundary, or whether a strict subset (e.g. one of the two) addresses are covered by the boundary. FIG. 6 illustrates the mappings of inputs to outputs.

FIG. 4A shows an example, in pseudocode, of the behaviour of the lower comparison circuitry 202. The input A is the address to be tested, and the input B is the boundary address. The process determines the difference (diff) of the most significant bits between A and B. If all of the bits of the difference are zero then A and B are referring to the same block. If the next least significant bits of A are zero then the address is at the bottom of the block and so A and B are considered to be equal. Otherwise, the most significant bit of the difference is examined to determine whether the difference is positive or negative. If it is negative then A is less than the base address B. Otherwise, A is greater than the base address B. Note that this example assumes that the block/region is at least 32 bytes and hence there is no need for the diff to be calculated for the bottom five bits ([4:0]), which are used to address within the 32-byte block. Clearly for architectures where the minimum region size is larger, the diff can consider a smaller set of bits and where the minimum region size is smaller, the diff may consider a larger set of bits.

FIG. 4B shows an example, in pseudocode, of the behaviour of the lower comparison circuitry 204. The input A is the address to be tested, and the input B is the boundary address. The process determines the difference (diff) of the most significant N−(N/8) bits between A and B. If all of the bits of the difference are zero then A and B are referring to the same block of 32-bits. If the next least significant bits of A are one then the address is at the top of the 32-bit block and so A and B are considered to be equal. Otherwise, if all of the bits of the difference are zero or if the most significant bit of the difference is '1' then A is less than the limit or upper address B. Otherwise A is greater than the limit address B. As with the behaviour of the upper comparison circuitry, the 32-byte block, and hence the bits that are considered for the diff is architecture dependent.

The illustrated technique therefore illustrates how it is possible to determine, for two addresses that are adjacent to one another, whether those two addresses are covered by a region (e.g. at least equal to the base of a region and less than the limit of a region), not covered by the region, or whether only one of the addresses is covered by the region. Furthermore, this checking can be achieved using only two comparisons for both addresses (e.g. rather than comparing both addresses to both the base and the limit, which would necessitate four comparisons).

Figure 5:
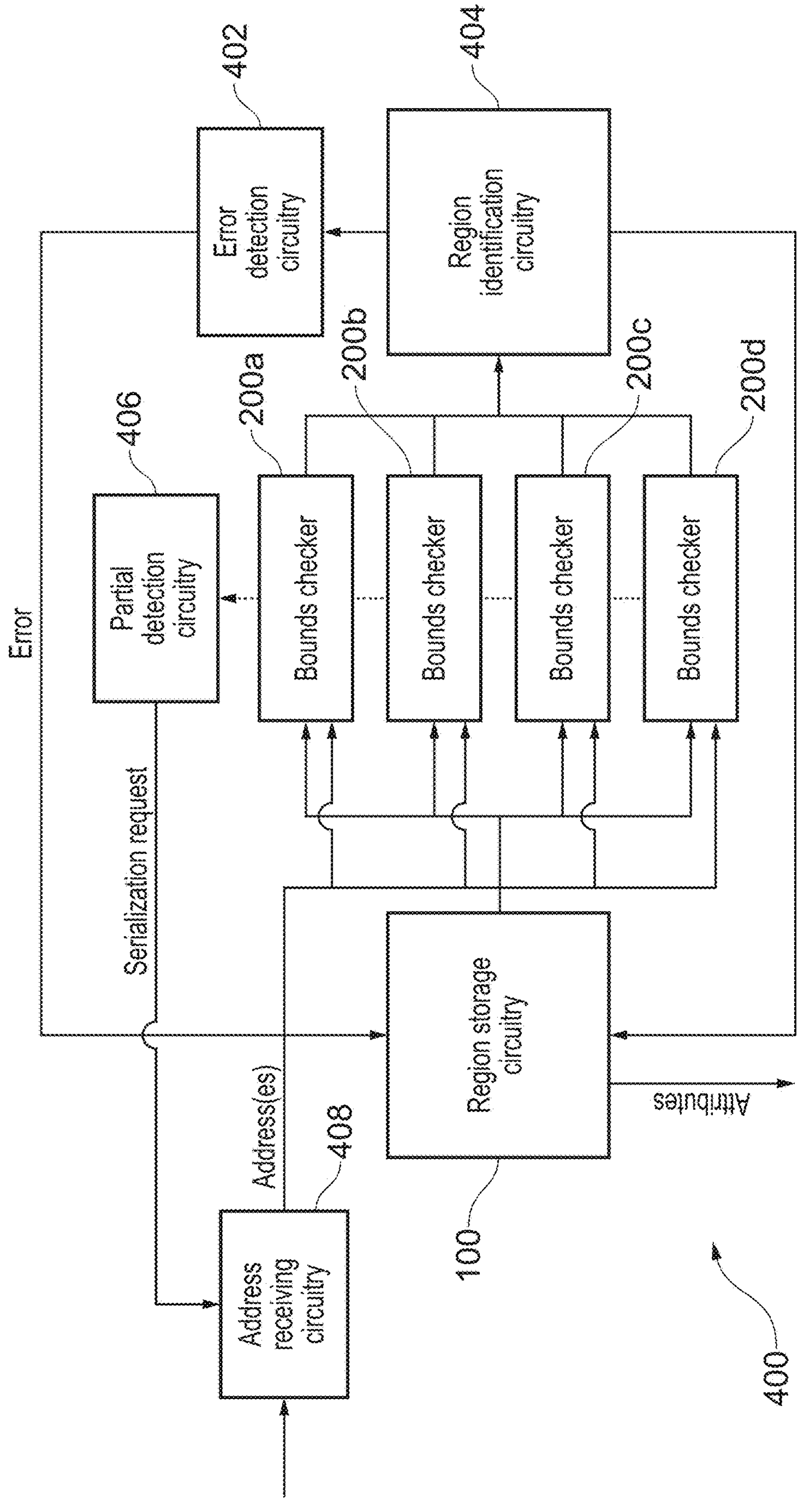
FIG. 5 shows an example of an apparatus in which a number of regions can be simultaneously compared to a pair of adjacent addresses in a time-overlapping manner.

FIG. 5 illustrates how this information can be used to return the attributes that apply to a pair of addresses. Several copies 200a, 200b, 200c, 200d of the bounds checker 200 that was illustrated in FIG. 3 are provided and each receives details of a different one of the regions that are stored in the region storage circuitry 100. In this example, one bounds checker 200 is provided for each region that can be simultaneously stored in the region storage circuitry 100 thereby allowing the boundaries of each region to be checked in parallel. This, however, is not essential and a more sequential check may be performed (depending on the speed of the circuitry). Each bounds checker 200 therefore receives a different one of the regions in the region storage circuitry 100 together with a pair of adjacent addresses to be checked, which are received by the address receiving circuitry 408.

The bounds checkers 200*a*, 200*b*, 200*c*, 200*d* provide one of three different outputs as previously described, and these are passed to region identification circuitry 404. For the region that 'hits', the region identification circuitry 404 causes the corresponding attributes to be output that are stored in the region storage circuitry 100.

Note that the term 'upper comparison circuitry' may be extended to cover the upper comparison circuit 204 of each of the bounds checkers 200*a*, 200*b*, 200*c*, 200*d*. Furthermore, the term 'lower comparison circuitry' may cover the lower comparison circuit 202 of each of the bounds checkers 200*a*, 200*b*, 200*c*, 200*d*.

Error detection circuitry 402 is also provided, which can be used to detect an error condition. One particular error condition that might be detected is the situation where more than one region in the region storage circuitry 100 'hits'. In this situation an error is generated, which may take the form of an exception or interrupt. In this example, the region storage circuitry is notified, which can respond as programmed (e.g. by returning any of the regions, a given one of the regions, or nothing at all). Clearly, depending on the action taken, this signal line may be removed or may be extended as appropriate.

One the bounds checkers 200*a*, 200*b*, 200*c*, 200*d* may report a partial result. That is, one of the multiple adjacent addresses could fall within the scope of a boundary, but another does not. This situation is detected by the partial detection circuitry 406. When this situation occurs, a serialization request is sent to the address receiving circuitry 408 for the addresses to be sent individually so that the attributes can be associated with each of the addresses. Note that the same bounds checkers 200*a*, 200*b*, 200*c*, 200*d* can be sent for the serialized situation (or indeed for individual addresses) at little to no extra cost.

FIG. 6 is a table that shows the operation of the output circuitry 206 in converting the 'less than', 'equal to', and 'greater than' outputs for each of the lower comparison circuitry 202 and the upper comparison circuitry 204 (as defined in FIGS. 4A and 4B) into an output that indicates the extent to which the adjacent addresses are covered by a particular region. In short, when performing such a wide comparison (i.e. with two addresses) if either the lower comparison circuitry 202 or the upper comparison circuitry 204 provide a result of 'equal' (which need not be the case that the addresses are actually identical as illustrated in FIGS. 4A and 4B, merely that the same word is being referred to) then the overall result is a 'partial' hit. A hit is said to occur with the lower comparison circuitry 202 if the provided adjacent address is greater than the provided region base (the lower end of the region). Meanwhile, a hit is said to occur with the upper comparison circuitry 204 if the provided address is less than the provided region limit (the upper end of the region). If both the address and adjacent address hit then a 'both' output is provided indicating that both addresses fall within the region. If neither the address nor the adjacent address hit then a 'neither' output is provided indicating that neither address falls within the region.

When a narrower comparison is being performed (i.e. if the previously described two addresses are handled individually as a single address so that the bit width of the address being compared is less than or equal to, then a hit is said to occur with the lower comparison circuitry 202 if the provided adjacent address is greater than or equal to the provided region base (the lower end of the region). Meanwhile, a hit is said to occur with the upper comparison circuitry 204 if the provided address is less than or equal to the provided region limit (the upper end of the region). That is the partial results are also hits.

In a first example (1), the lower address of 00000000 (an example of 'the address' in the claims) is less than the region limit of 00001000 (the end of the region) and the upper address of 00000004 (an example of 'the adjacent address' in the claims) is greater than the region base of 00000000 (the start of the region). In this case, both addresses 'hit' and so the 'both' output is provided.

In a second example (2), the lower address is less than the region limit and the upper address is less than the region base. Consequently, neither word falls within the region and so both words are considered a 'miss'.

In a third example (3), the lower address is less than the region limit (a hit) but the upper address is equal to the region base (partial). Consequently, the result is 'partial', which causes the partial detection circuitry 406 to request that the addresses are sent individually to the bounds checkers 200*a*, 200*b*, 200*c*, 200*d* to produce two separate outputs—thereby identifying which of the addresses fall within the region.

In a fourth example, two bounds checkers return results, which is an error situation. In particular, in the first case, the lower address is less than the first region limit and the upper address is greater than the first region base. This would normally indicate a hit (both addresses falling within the scope of the first region). However, also in this case, there is a second region in which the lower address is less than the second region limit and the upper address is equal to the second region base. This would correspond with a partial result. The 'partial' result causes a replay of the two addresses (such that they are sent in one after the other, to both the lower comparison circuitry 202 and the upper comparison circuitry 204) to see if this helps to at least partially resolve the fact that multiple regions seem to apply. If, in re-running, there is still a situation in which one of the addresses matches two regions then an error is raised.

As already discussed, in other embodiments, the error may be replaced some predefined behaviour (resolving however is desired). In any case, the error may also be freely defined as to whether any result is returned—which result is returned (if one is returned) and so on.

In a fifth example situation (5), the lower address is 'equal' to the region limit address and the upper address is greater than the region base address. In this case (when considering the 32 byte granules for the base and limits as shown in FIGS. 4A and 4B), there is a partial hit, so a replay occurs.

In a sixth example situation (6), both the lower address and the upper address are greater than the base region address and the limit region address. The overall result is therefore than neither address is within the region.

In a seventh example situation (7), the lower address is 'equal' to a first region limit address (partial) and the upper address is greater than the first region base address (hit), which overall represents a partial result. Simultaneously, the lower address is less than a second region limit address (hit) and the upper address is 'equal' to a second region base address (partial), which represents a second partial result. The addresses are therefore re-run individually through both comparators 202, 204 as a serialized request.

In an eighth example situation (8), the lower address is 'equal' to the region limit address (a 'partial' result) and the upper address is 'greater than' the region base address (a hit) and therefore a partial result is achieved.

Consequently, it can be seen that when:

The lower address is greater than the region base AND the upper address is less than the region limit, then the result is that both addresses are within that region.

Both the lower and upper addresses are greater than the region limit, OR both the lower and upper addresses are less than the region base, then the result is that both addresses are outside the region.

If the lower address is equal to the region limit, or the upper address is equal to the region base, then there is a partial overlap.

These determinations are made in most cases without making the full set of comparisons. In particular, without comparing the lower address to the region base address or the upper address to the region limit address.

Figure 7:
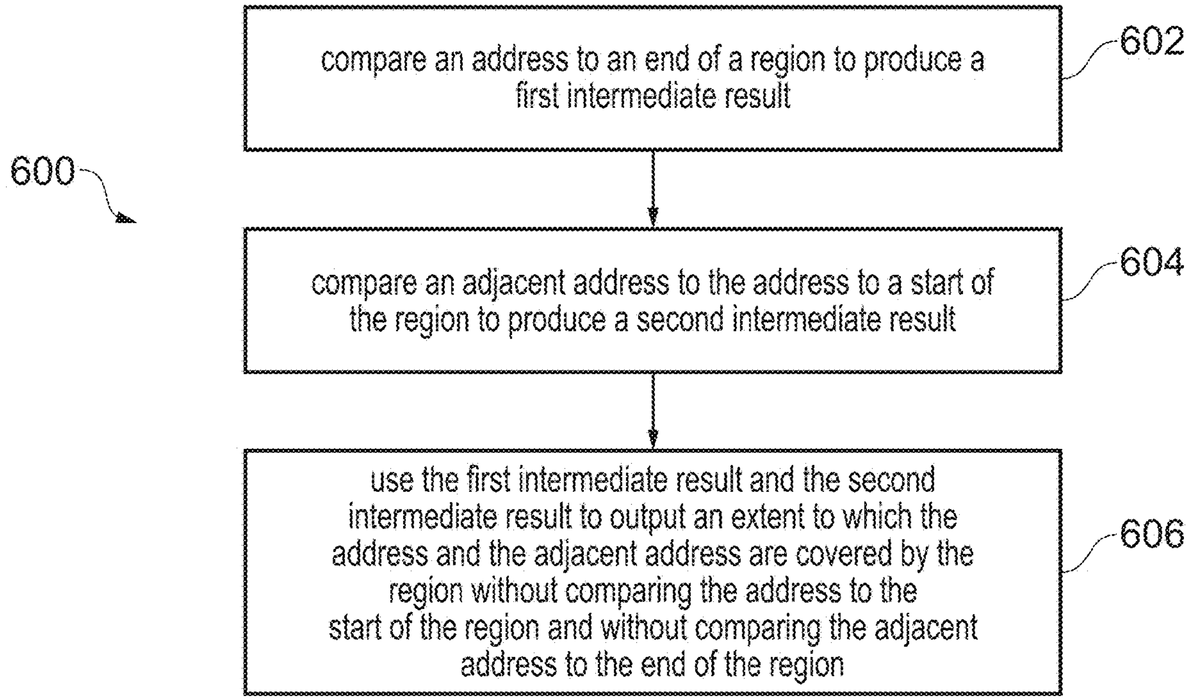
FIG. 7 shows a method, in the form of a flowchart, of data processing in accordance with some examples.

FIG. 7 shows a method of data processing in the form of a flowchart 600. At a first step 602, an address is compared to an end of a region to produce a first intermediate result. At a second step 604, an adjacent address (above the other address) is compared to a start of that region to produce a second intermediate result. Then at a third step 606, these two intermediate results are used to produce an output that indicates an extent to which the address and adjacent address are covered by the region. This output is produced without the address being compared to the start of the region and without the adjacent address being compared to the end of the region. Consequently, the number of comparisons that are required 'per region' is kept small.

Note that although the above example considers a 32-bit architecture in which memory accesses are made to 64-bit values, other accesses are also possible. For example, the same technique is applicable to a 64-bit architecture in which memory accesses are made to 128-bit values or 256-values. The same general technique can be used although this would require mathematical changes to be made to the functions shown in FIGS. 4A and 4B to address the different memory sizes.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 8:
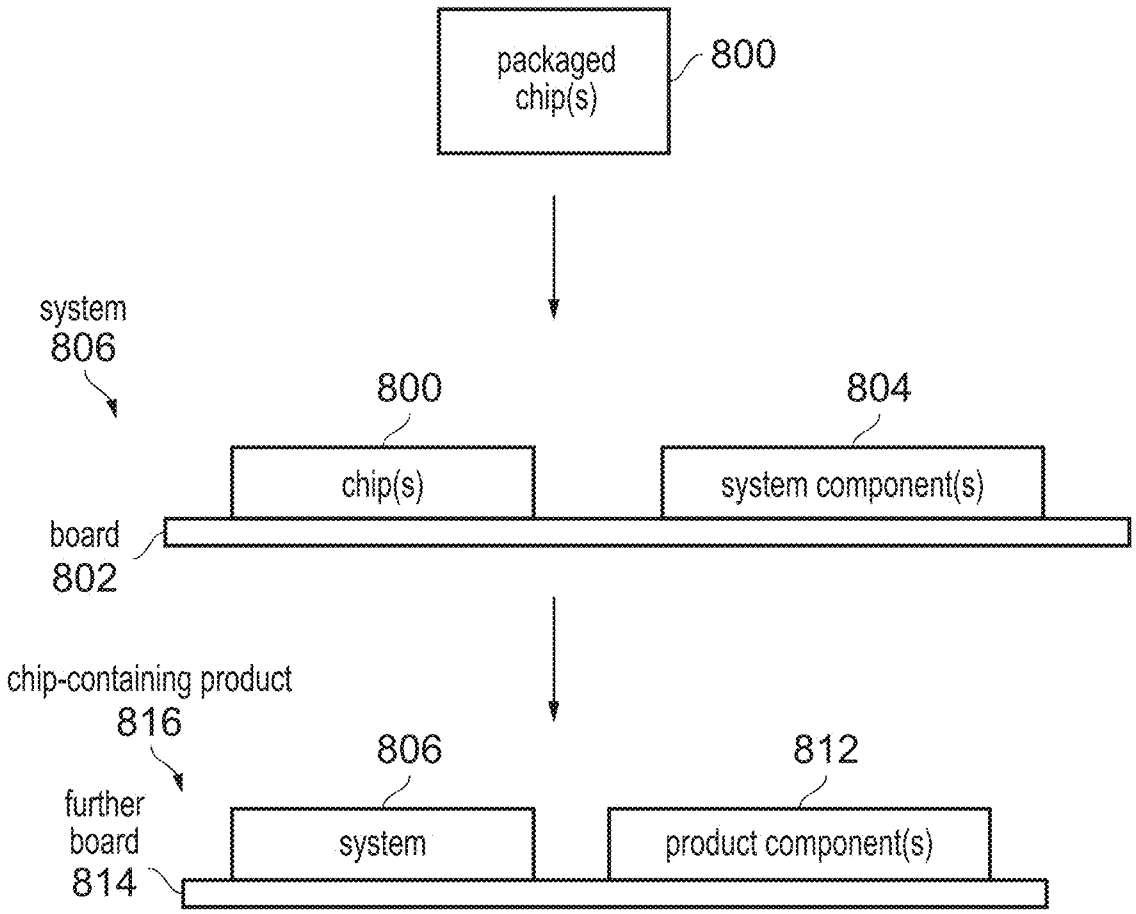
FIG. 8 shows one or more packaged chips in accordance with some examples.

As shown in FIG. 8, one or more packaged chips 800, with the apparatus described above implemented on one chip or distributed over two or more of the chips, are manufactured by a semiconductor chip manufacturer. In some examples, the chip product 800 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 800 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 800 are assembled on a board 802 together with at least one system component 804 to provide a system 806. For example, the board may comprise a printed circuit board. The board substrate may be made of any of a variety of materials, e.g. plastic, glass, ceramic, or a flexible substrate material such as paper, plastic or textile material. The at least one system component 804 comprise one or more external components which are not part of the one or more packaged chip(s) 800. For example, the at least one system component 804 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 816 is manufactured comprising the system 806 (including the board 802, the one or more chips 800 and the at least one system component 804) and one or more product components 812. The product components 412 comprise one or more further components which are not part of the system 806. As a non-exhaustive list of examples, the one or more product components 812 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 812 may be assembled on to a further board 814.

The board 802 or the further board 814 may be provided on or within a device housing or other structural support (e.g. a frame or blade) to provide a product which can be handled by a user and/or is intended for operational use by a person or company. The system 806 or the chip-containing product 816 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The system could be configured as follows:

(1). An apparatus comprising:
- upper comparison circuitry configured to compare an address to an end of a region to produce a first intermediate result;
- lower comparison circuitry configured to compare an adjacent address to the address to a start of the region to produce a second intermediate result; and
- output circuitry configured to use the first intermediate result and the second intermediate result to output an extent to which the address and the adjacent address are covered by the region without the lower comparison circuitry comparing the address or without the upper comparison circuitry comparing the adjacent address.

(2). The apparatus according to (1), wherein
- the extent to which the address and the adjacent address are covered by the region comprises any one of:
  - both the address and the adjacent address are covered by the region,
  - neither the address nor the adjacent address are covered by the region, and
  - a strict subset of the address and the adjacent address are covered by the region.

(3). The apparatus according to (2), wherein
- in response to the output circuitry outputting that the strict subset of the address and the adjacent address are covered by the region, the address and the adjacent address are sent to each of the lower comparison circuitry and the upper comparison circuitry, and the lower comparison circuitry compares both the address and the adjacent address, and the upper comparison circuitry compares both the address and the adjacent address.

(4). The apparatus according to any one of (2)-(3), wherein
- the lower comparison circuitry is configured, in response to the output circuitry outputting that the strict subset of the address and the adjacent address are covered by the region, to serially compare the address and the adjacent address to the start of the region; and
- the upper comparison circuitry is configured, in response to the output circuitry outputting that the strict subset of the address and the adjacent address are covered by the region, to serially compare the address and the adjacent address to the end of the region.

(5). The apparatus according to any one of (1)-(4), wherein the adjacent address immediately follows the address.

(6). The apparatus according to (5), wherein the upper comparison circuitry is configured to produce the first intermediate result as any one of: the address being greater than the end of the region, the address being less than the end of the region, and the address being equal to the end of the region.

(7). The apparatus according to any one of (5)-(6), wherein the lower comparison circuitry is configured to produce the second intermediate result as any one of: the adjacent address being greater than the start of the region, the address being less than the start of the region, and the address being equal to the start of the region.

(8). The apparatus according to (5), wherein the upper comparison circuitry is configured to produce the first intermediate result as the address being greater than the end of the region, less than the end of the region, or equal to the end of the region;

the lower comparison circuitry is configured to produce the second intermediate result as the adjacent address being greater than the start of the region, less than the start of the region, or equal to the start of the region; and the output circuitry is configured to output the result as the address and the adjacent address being covered by the region in response to both the first intermediate result being that the address is less than the end of the region and the second intermediate result being that the adjacent address is greater than the start of the region.

(9). The apparatus according to (8), wherein the output circuitry is configured to output the result as the address and the adjacent address not being covered by the region in response to the first intermediate result and the second intermediate result being the same.

(10). The apparatus according to any one of (8)-(9), wherein the output circuitry is configured to output the result as a strict subset of the address and the adjacent address being covered by the region in response to either the first intermediate result indicating that the address is equal to the end of the region, or the second intermediate result indicating that the adjacent address is equal to the start of the region.

(11). The apparatus according to any preceding claim, comprising:

region storage circuitry configured to store region boundaries for a plurality of regions including the region; and region identification circuitry configured to perform a determination of which of the regions the address and adjacent address are covered by, using the first intermediate result and the second intermediate result calculated for the start address and the end address of each of the region boundaries.

(12). The apparatus according to (10), wherein the region storage circuitry is configured to store attribute sets in association with each of the region boundaries; and the region identification circuitry is configured, in response to the determination, to return one of the attribute sets associated with covering ones of the region boundaries.

(13). The apparatus according to any one of (11)-(12), wherein the upper comparison circuitry comprises no more than one comparator for each of the regions; and the lower comparison circuitry comprises no more than one comparator for each of the regions.

(14). The apparatus according to any one of (10)-(12), comprising:

error detection circuitry configured to respond to the address being covered by a plurality of the regions by generating an error event.

(15). A method comprising:

comparing an address to an end of a region to produce a first intermediate result;

comparing an adjacent address to the address to a start of the region to produce a second intermediate result; and using the first intermediate result and the second intermediate result to output an extent to which the address and the adjacent address are covered by the region without comparing the address to the start of the region or without comparing the adjacent address to the end of the region.

(16). A non-transitory computer-readable medium to storing computer-readable code for fabrication of an apparatus comprising:

upper comparison circuitry configured to compare an address to an end of a region to produce a first intermediate result;

lower comparison circuitry configured to compare an adjacent address to the address to a start of the region to produce a second intermediate result; and output circuitry configured to use the first intermediate result and the second intermediate result to output an extent to which the address and the adjacent address are covered by the region without the lower comparison circuitry comparing the address or without the upper comparison circuitry comparing the adjacent address.

(17). A system comprising:

the apparatus of any preceding claim, implemented in at least one packaged chip;

at least one system component; and a board, wherein the at least one packaged chip and the at least one system component are assembled on the board.

(18). A chip-containing product comprising (17), wherein the system is assembled on a further board with at least one other product component.

We claim:

1. An apparatus comprising:

upper comparison circuitry configured to compare an address to an end of a region to produce a first intermediate result;

lower comparison circuitry configured to compare an adjacent address to the address to a start of the region to produce a second intermediate result; and output circuitry configured to use the first intermediate result and the second intermediate result to output an extent to which the address and the adjacent address are covered by the region without the lower comparison circuitry comparing the address or without the upper comparison circuitry comparing the adjacent address.

2. The apparatus according to claim 1, wherein the extent to which the address and the adjacent address are covered by the region comprises any one of: both the address and the adjacent address are covered by the region, neither the address nor the adjacent address are covered by the region, and a strict subset of the address and the adjacent address are covered by the region.

3. The apparatus according to claim 2, wherein in response to the output circuitry outputting that the strict subset of the address and the adjacent address are covered by the region, the address and the adjacent address are sent to each of the lower comparison circuitry and the upper comparison circuitry, and the lower comparison circuitry compares both the address and the adjacent address, and the upper comparison circuitry compares both the address and the adjacent address.

4. The apparatus according to claim 2, wherein the lower comparison circuitry is configured, in response to the output circuitry outputting that the strict subset of the address and the adjacent address are covered by the region, to serially compare the address and the adjacent address to the start of the region; and the upper comparison circuitry is configured, in response to the output circuitry outputting that the strict subset of the address and the adjacent address are covered by the region, to serially compare the address and the adjacent address to the end of the region.

5. The apparatus according to claim 1, wherein the adjacent address immediately follows the address.

6. The apparatus according to claim 5, wherein the upper comparison circuitry is configured to produce the first intermediate result as any one of: the address being greater than the end of the region, the address being less than the end of the region, and the address being equal to the end of the region.

7. The apparatus according to claim 5, wherein the lower comparison circuitry is configured to produce the second intermediate result as any one of: the adjacent address being greater than the start of the region, the address being less than the start of the region, and the address being equal to the start of the region.

8. The apparatus according to claim 5, wherein the upper comparison circuitry is configured to produce the first intermediate result as the address being greater than the end of the region, less than the end of the region, or equal to the end of the region; the lower comparison circuitry is configured to produce the second intermediate result as the adjacent address being greater than the start of the region, less than the start of the region, or equal to the start of the region; and the output circuitry is configured to output the result as the address and the adjacent address being covered by the region in response to both the first intermediate result being that the address is less than the end of the region and the second intermediate result being that the adjacent address is greater than the start of the region.

9. The apparatus according to claim 8, wherein the output circuitry is configured to output the result as the address and the adjacent address not being covered by the region in response to the first intermediate result and the second intermediate result being the same.

10. The apparatus according to claim 8, wherein the output circuitry is configured to output the result as a strict subset of the address and the adjacent address being covered by the region in response to either the first intermediate result indicating that the address is equal to the end of the region, or the second intermediate result indicating that the adjacent address is equal to the start of the region.

11. The apparatus according to claim 1, comprising: region storage circuitry configured to store region boundaries for a plurality of regions including the region; and region identification circuitry configured to perform a determination of which of the regions the address and adjacent address are covered by, using the first intermediate result and the second intermediate result calculated for the start address and the end address of each of the region boundaries.

12. The apparatus according to claim 10, wherein the region storage circuitry is configured to store attribute sets in association with each of the region boundaries; and the region identification circuitry is configured, in response to the determination, to return one of the attribute sets associated with covering ones of the region boundaries.

13. The apparatus according to claim 11, wherein the upper comparison circuitry comprises no more than one comparator for each of the regions; and the lower comparison circuitry comprises no more than one comparator for each of the regions.

14. The apparatus according to claim 10, comprising: error detection circuitry configured to respond to the address being covered by a plurality of the regions by generating an error event.

15. A method comprising: comparing an address to an end of a region to produce a first intermediate result; comparing an adjacent address to the address to a start of the region to produce a second intermediate result; and using the first intermediate result and the second intermediate result to output an extent to which the address and the adjacent address are covered by the region without comparing the address to the start of the region or without comparing the adjacent address to the end of the region.

16. A non-transitory computer-readable medium to storing computer-readable code for fabrication of an apparatus comprising: upper comparison circuitry configured to compare an address to an end of a region to produce a first intermediate result; lower comparison circuitry configured to compare an adjacent address to the address to a start of the region to produce a second intermediate result; and output circuitry configured to use the first intermediate result and the second intermediate result to output an extent to which the address and the adjacent address are covered by the region without the lower comparison circuitry comparing the address or without the upper comparison circuitry comparing the adjacent address.

17. A system comprising: the apparatus of claim 1, implemented in at least one packaged chip; at least one system component; and a board, wherein the at least one packaged chip and the at least one system component are assembled on the board.

18. A chip-containing product comprising the system of claim 17, wherein the system is assembled on a further board with at least one other product component.

* * * * *